United States Patent
Kovvali et al.

(10) Patent No.: US 9,043,467 B2
(45) Date of Patent: May 26, 2015

(54) ADAPTIVE CHUNKED AND CONTENT-AWARE PACING OF MULTI-MEDIA DELIVERY OVER HTTP TRANSPORT AND NETWORK CONTROLLED BIT RATE SELECTION

(75) Inventors: Surya Kumar Kovvali, Westborough, MA (US); Ankush Gupta, Bangalore (IN); Sandeep Agarwal, Bangalore (IN); Nizar K Purayil, Bangalore (IN); Christopher Leary, Amherst, NH (US)

(73) Assignee: Movik Networks, Westford, MA (US)

( * ) Notice: Subject to any disclaimer, the term of this patent is extended or adjusted under 35 U.S.C. 154(b) by 228 days.

(21) Appl. No.: 13/048,378

(22) Filed: Mar. 15, 2011

(65) Prior Publication Data

US 2011/0167170 A1    Jul. 7, 2011

Related U.S. Application Data

(63) Continuation-in-part of application No. 12/696,378, filed on Jan. 29, 2010, now Pat. No. 8,717,890.

(60) Provisional application No. 61/313,872, filed on Mar. 15, 2010, provisional application No. 61/148,454, filed on Jan. 30, 2009.

(51) Int. Cl.
*G06F 15/173* (2006.01)
*H04L 29/08* (2006.01)
(Continued)

(52) U.S. Cl.
CPC ......... *H04L 67/2823* (2013.01); *H04L 41/0896* (2013.01); *H04N 7/12* (2013.01);
(Continued)

(58) Field of Classification Search
CPC ............ H04W 24/08; H04W 28/0231; H04W 28/0284; H04W 28/0289; H04L 47/74; H04N 7/12
USPC ........................... 709/231, 223–226; 725/105
See application file for complete search history.

(56) References Cited

U.S. PATENT DOCUMENTS

| | | | |
|---|---|---|---|
| 5,990,810 | A | 11/1999 | Williams |
| 6,105,064 | A | 8/2000 | Davis et al. |

(Continued)

FOREIGN PATENT DOCUMENTS

| | | |
|---|---|---|
| CN | 1754369 A | 3/2006 |
| CN | 101299770 A | 11/2008 |

(Continued)

OTHER PUBLICATIONS

European Communication mailed Jul. 5, 2012 in co-pending European patent application No. EP 1073640.6.
(Continued)

*Primary Examiner* — Shirley Zhang
(74) *Attorney, Agent, or Firm* — Nields, Lemack & Frame, LLC (57) ABSTRACT

A network device, capable of understanding communications between an end user and the core network on a RAN network is disclosed. In some embodiments, the device is able to decode the control plane and the user plane. As such, it is able to determine when the end user has requested multimedia content. Once this is known, the device can optimize the delivery of that content in several ways. In one embodiment, the device requests the content from the content server (located in the core network) and transmits this content in a just-in-time manner to the end user. In another embodiment, the device automatically changes the encoding and resolution of the content, based on overall monitored network traffic. In another embodiment, the device automatically selects or modifies the format and resolution options based on overall bandwidth limitations, independent of the end user.

23 Claims, 5 Drawing Sheets

(51) Int. Cl.
*H04W 28/06* (2009.01)
*H04L 12/24* (2006.01)
*H04N 7/12* (2006.01)
*H04L 12/911* (2013.01)
*H04W 4/18* (2009.01)
*H04W 28/22* (2009.01)
*H04W 88/06* (2009.01)
*H04L 29/06* (2006.01)

(52) U.S. Cl.
CPC ............... *H04L 47/74* (2013.01); *H04W 4/18* (2013.01); *H04W 28/06* (2013.01); *H04W 28/22* (2013.01); *H04W 88/06* (2013.01); *H04L 67/325* (2013.01); *H04L 69/18* (2013.01); *H04L 69/24* (2013.01)

(56) References Cited

U.S. PATENT DOCUMENTS

| | | |
|---|---|---|
| 6,694,349 B1 | 2/2004 | Zou |
| 6,798,786 B1 | 9/2004 | Lo et al. |
| 6,907,501 B2 | 6/2005 | Tariq et al. |
| 6,917,984 B1 | 7/2005 | Tan |
| 6,996,085 B2 | 2/2006 | Travostino et al. |
| 7,047,312 B1 | 5/2006 | Aweya et al. |
| 7,177,273 B2 | 2/2007 | Peelen et al. |
| 7,318,100 B2 | 1/2008 | Demmer et al. |
| 7,333,431 B2 | 2/2008 | Wen et al. |
| 7,412,531 B1 | 8/2008 | Lango et al. |
| 7,489,690 B2 | 2/2009 | Kakadia |
| 7,568,071 B2 | 7/2009 | Kobayashi et al. |
| 7,583,594 B2 | 9/2009 | Zakrzewski |
| 7,602,872 B2 | 10/2009 | Suh et al. |
| 7,710,873 B2 | 5/2010 | Pulkka et al. |
| 7,715,418 B2 | 5/2010 | Cho et al. |
| 7,734,804 B2 | 6/2010 | Lorenz et al. |
| 7,739,383 B1 | 6/2010 | Short et al. |
| 7,797,369 B2 | 9/2010 | Glickman |
| 7,852,763 B2 | 12/2010 | Ghanadan et al. |
| 7,965,634 B2 | 6/2011 | Aoyanagi |
| 7,991,905 B1* | 8/2011 | Roussos et al. ............... 709/231 |
| 8,111,630 B2 | 2/2012 | Kovvali et al. |
| 8,161,158 B2 | 4/2012 | Curcio et al. |
| 8,190,674 B2* | 5/2012 | Narayanan et al. .......... 709/203 |
| 8,208,430 B2 | 6/2012 | Valmikam et al. |
| 8,576,744 B2 | 11/2013 | Kovvali et al. |
| 8,717,890 B2 | 5/2014 | Kovvali et al. |
| 8,755,405 B2 | 6/2014 | Kovvali et al. |
| 8,799,480 B2 | 8/2014 | Kovvali et al. |
| 2003/0003919 A1 | 1/2003 | Beming et al. |
| 2003/0095526 A1 | 5/2003 | Froehlich et al. |
| 2003/0120805 A1 | 6/2003 | Couts et al. |
| 2003/0145038 A1 | 7/2003 | Bin Tariq et al. |
| 2003/0179720 A1 | 9/2003 | Cuny |
| 2003/0195977 A1* | 10/2003 | Liu et al. ..................... 709/231 |
| 2004/0068571 A1 | 4/2004 | Ahmavaara |
| 2004/0098748 A1* | 5/2004 | Bo et al. ..................... 725/105 |
| 2004/0193397 A1 | 9/2004 | Lumb et al. |
| 2004/0214586 A1 | 10/2004 | Loganathan et al. |
| 2004/0223505 A1* | 11/2004 | Kim et al. ..................... 370/412 |
| 2004/0240390 A1 | 12/2004 | Seckin |
| 2004/0258070 A1 | 12/2004 | Arima |
| 2004/0264368 A1 | 12/2004 | Heiskari et al. |
| 2005/0033857 A1 | 2/2005 | Imiya |
| 2005/0047416 A1 | 3/2005 | Heo et al. |
| 2005/0097085 A1 | 5/2005 | Shen et al. |
| 2005/0117583 A1 | 6/2005 | Uchida et al. |
| 2005/0135428 A1 | 6/2005 | Hellgren |
| 2005/0136973 A1 | 6/2005 | Llamas et al. |
| 2005/0157646 A1 | 7/2005 | Addagatla et al. |
| 2006/0018294 A1 | 1/2006 | Kynaslahti et al. |
| 2006/0019677 A1 | 1/2006 | Teague et al. |
| 2006/0117139 A1 | 6/2006 | Kobayashi et al. |
| 2006/0159121 A1 | 7/2006 | Sakata et al. |
| 2006/0167975 A1 | 7/2006 | Chan et al. |
| 2006/0193289 A1 | 8/2006 | Ronneke et al. |
| 2006/0198378 A1 | 9/2006 | Rajahalme |
| 2006/0274688 A1 | 12/2006 | Maxwell et al. |
| 2007/0019553 A1 | 1/2007 | Sagfors et al. |
| 2007/0019599 A1 | 1/2007 | Park et al. |
| 2007/0025301 A1 | 2/2007 | Petersson et al. |
| 2007/0070894 A1 | 3/2007 | Wang et al. |
| 2007/0113013 A1 | 5/2007 | Knoth |
| 2007/0143218 A1 | 6/2007 | Vasa |
| 2007/0174428 A1 | 7/2007 | Lev Ran et al. |
| 2007/0223379 A1 | 9/2007 | Sivakumar et al. |
| 2007/0230342 A1 | 10/2007 | Skog |
| 2007/0248048 A1 | 10/2007 | Zhu et al. |
| 2007/0254671 A1 | 11/2007 | Liu |
| 2008/0026789 A1 | 1/2008 | Llamas et al. |
| 2008/0052366 A1 | 2/2008 | Olsen et al. |
| 2008/0081637 A1 | 4/2008 | Ishii et al. |
| 2008/0082753 A1 | 4/2008 | Licht et al. |
| 2008/0162713 A1* | 7/2008 | Bowra et al. ................. 709/231 |
| 2008/0186912 A1 | 8/2008 | Huomo |
| 2008/0191816 A1 | 8/2008 | Balachandran et al. |
| 2008/0195745 A1 | 8/2008 | Bowra et al. |
| 2008/0212473 A1 | 9/2008 | Sankey et al. |
| 2008/0244095 A1 | 10/2008 | Vos et al. |
| 2008/0273533 A1* | 11/2008 | Deshpande .................... 370/392 |
| 2008/0320151 A1 | 12/2008 | McCanne et al. |
| 2009/0019178 A1* | 1/2009 | Melnyk et al. ............... 709/233 |
| 2009/0019229 A1 | 1/2009 | Morrow et al. |
| 2009/0024835 A1 | 1/2009 | Fertig et al. |
| 2009/0029644 A1 | 1/2009 | Sue et al. |
| 2009/0043906 A1* | 2/2009 | Hurst et al. ................... 709/231 |
| 2009/0156213 A1 | 6/2009 | Spinelli et al. |
| 2009/0196233 A1 | 8/2009 | Zhu et al. |
| 2009/0210904 A1 | 8/2009 | Baron et al. |
| 2009/0270098 A1 | 10/2009 | Gallagher et al. |
| 2009/0274161 A1 | 11/2009 | Liu |
| 2009/0274224 A1 | 11/2009 | Harris |
| 2009/0287842 A1 | 11/2009 | Plamondon |
| 2009/0291696 A1 | 11/2009 | Cortes et al. |
| 2010/0020685 A1 | 1/2010 | Short et al. |
| 2010/0023579 A1* | 1/2010 | Chapweske et al. .......... 709/203 |
| 2010/0034089 A1 | 2/2010 | Kovvali et al. |
| 2010/0057887 A1 | 3/2010 | Wang et al. |
| 2010/0067378 A1 | 3/2010 | Cohen et al. |
| 2010/0085962 A1 | 4/2010 | Issaeva et al. |
| 2010/0088369 A1 | 4/2010 | Sebastian et al. |
| 2010/0106770 A1* | 4/2010 | Taylor et al. .................. 709/203 |
| 2010/0158026 A1 | 6/2010 | Valmikam et al. |
| 2010/0161756 A1 | 6/2010 | Lewis et al. |
| 2010/0184421 A1 | 7/2010 | Lindqvist et al. |
| 2010/0195602 A1* | 8/2010 | Kovvali et al. ............... 370/329 |
| 2010/0205375 A1 | 8/2010 | Challener et al. |
| 2010/0215015 A1 | 8/2010 | Miao et al. |
| 2010/0254462 A1 | 10/2010 | Friedrich et al. |
| 2010/0272021 A1 | 10/2010 | Kopplin et al. |
| 2010/0291943 A1 | 11/2010 | Mihaly et al. |
| 2010/0325334 A1 | 12/2010 | Tsai et al. |
| 2011/0116460 A1 | 5/2011 | Kovvali et al. |
| 2011/0243553 A1 | 10/2011 | Russell |
| 2012/0077500 A1 | 3/2012 | Shaheen |
| 2012/0099533 A1 | 4/2012 | Kovvali et al. |
| 2012/0120788 A1 | 5/2012 | Hu |
| 2012/0184258 A1 | 7/2012 | Kovvali et al. |
| 2012/0191862 A1 | 7/2012 | Kovvali et al. |
| 2012/0220328 A1 | 8/2012 | Yu et al. |
| 2013/0246638 A1 | 9/2013 | Kovvali et al. |
| 2014/0056137 A1 | 2/2014 | Kovvali et al. |

FOREIGN PATENT DOCUMENTS

| | | |
|---|---|---|
| EP | 1445703 A1 | 8/2004 |
| EP | 1523171 A1 | 4/2005 |
| EP | 2197187 A1 | 6/2010 |
| JP | 2001-518744 A | 10/2001 |
| JP | 2006-92341 A | 4/2006 |
| JP | 2006-155121 A | 6/2006 |
| JP | 2006-196008 A | 7/2006 |
| JP | 2007-536818 A | 12/2007 |

(56) References Cited

FOREIGN PATENT DOCUMENTS

| WO | 99/17499 A2 | 4/1999 |
| WO | 2005/109825 A1 | 11/2005 |
| WO | 2007/016707 A2 | 2/2007 |
| WO | 2008/076073 A1 | 6/2008 |
| WO | 2009/096833 A1 | 8/2009 |
| WO | 2010/017308 A1 | 2/2010 |
| WO | 2010/060438 A1 | 6/2010 |
| WO | 2010/088490 A1 | 8/2010 |

OTHER PUBLICATIONS

3GPP TR 23.829 V0.4.0 (Jan. 2010), Technical Report, "3rd Generation Partnership Project; Technical Specification Group Services and System Aspects; Local IP Access and Selected IP Traffic Offload; (Release 10)", 29 pages, 3GPP Organizational Partners.

Http header enrichment, http://news.thomasnet.com/fullstory/Software-optimizes-high-speed-wireless-data-networks-485934, "Software optimizes high-speed wireless data networks", Jun. 26, 2006, 10 pages, Thomasnet News.

International Search Report and Written Opinion dated May 13, 2011 in corresponding foreign patent application No. PCT/US 11/28477.

Notice of Allowance mailed Oct. 13, 2011 in co-pending U.S. Appl. No. 12/536,537.

Office Action mailed Nov. 10, 2011 in co-pending U.S. Appl. No. 12/645,009.

Office Action mailed Oct. 23, 2012 in co-pending U.S. Appl. No. 12/696,378.

Office Action mailed Jan. 2, 2013 in co-pending U.S. Appl. No. 13/339,629.

Chinese Communication dispatched Feb. 16, 2013 in co-pending Chinese patent application No. CN 201080010586.X.

International Search Report/Written Opinion mailed Feb. 29, 2012 in co-pending PCT application No. PCT/US2011/044156.

International Search Report/Written Opinion mailed Feb. 29, 2012 in co-pending PCT application No. PCT/US2011/044361.

International Preliminary Report on Patentability mailed Feb. 23, 2012 in co-pending PCT application No. PCT/US09/52871.

Proceedings of the USENIX Symposium on Internet Technologies and Systems, Dec. 1997, "Cost-Aware WWW Proxy Caching Algorithms", 15 pages, CAO, et al.

The Book of Webmin . . . Or: How I Learned to Stop Worrying and Love UNIX, 2003, Chapter 12—Squid, 23 pages, Cooper.

Proceedings of the 3rd International Workshop on Modeling Analysis and Simulation of Wireless and Mobil Systems (MSWIM '00), ACM, 2000, pp. 77-84, "Prefetching Policies for Energy Saving and Latency Reduction in a Wireless Broadcast Data Delivery System", Grassi.

Eighth ACIS International Conference on Software Engineering, Artificial Intelligence, Networking, and Parallel/Distributed Computing, IEEE, 2007, "An Integrated Prefetching and Caching Scheme for Mobile Web Caching System", p. 522-527, Jin, et al.

Proceedings of the 22nd International Conference on Distributed Computing Systems (ICDCS '02), IEEE, 2002, "Power-Aware Prefetch in Mobile Environments", 8 pages, Yin, et al.

Office Action mailed Apr. 12, 2013 in co-pending U.S. Appl. No. 13/185,066.

Office Action dated Mar. 15, 2011 in co-pending U.S. Appl. No. 12/536,537.

International Search Report/Written Opinion dated Oct. 6, 2009 in co-pending international application PCT/US2009/052871.

International Search Report/Written Opinion dated Mar. 1, 2010 in co-pending international application PCT/US2009/069260.

International Search Report/Written Opinion dated Mar. 12, 2010 in co-pending international application PCT/US2010/22542.

RFC 1644-T/TCP—TCP Extensions for Translations Functional Specification, Jul. 1994—http://www.faqs.org/rfcs/rfc1644.html, R. Braden, et al.

RFC 3135—Performance Enhancing Proxies Intended to Mitigate Link-Related Degradations, Jun. 2001—http://www.faqs.org.rfcs/rfc3135.html, J. Border et al.

RFC 2045—Multipurpose Internet Mail Extensions (MIME) Part One: Formal of Internet Message Bodies; Nov. 1996—http://www.faqs.org/rfcs/r.fc2045.html, N. Freed, et al.

Notice of Allowance mailed Apr. 12, 2012 in co-pending U.S. Appl. No. 12/645,009.

Chinese Communication, with English translation, issued May 10, 2013 in co-pending Chinese patent application No. 200980139488.3.

English translation of Japanese Communication, mailed Aug. 13, 2013 in co-pending Japanese patent application No. 2011-522222.

Notice of Allowance mailed Sep. 19, 2013 in co-pending U.S. Appl. No. 13/339,629.

International Search Report and Written Opinion completed Mar. 3, 2011 in PCT application No. PCT/US2010/056073.

Office Action mailed Sep. 18, 2012 in co-pending U.S. Appl. No. 12/942,913.

Office Action mailed Jul. 19, 2013 in co-pending U.S. Appl. No. 12/942,913.

Notice of Allowance mailed May 29, 2013 in co-pending U.S. Appl. No. 13/339,629.

HP Labs Report No. HPL-1999-69, May 1999, pp. 1-17, "Enhancement and Validation of Squid's Cache Replacement Policy", 18 pages, Dilley, et al.

Final Rejection mailed Nov. 26, 2013 in co-pending U.S. Appl. No. 12/696,378.

Notice of Allowance mailed Dec. 23, 2013 in co-pending U.S. Appl. No. 12/696,378.

Notice of Allowance mailed Jan. 6, 2014 in co-pending U.S. Appl. No. 12/942,913.

Office Action—Restriction—mailed Dec. 26, 2013 in co-pending U.S. Appl. No. 13/183,777.

Final Rejection mailed Nov. 18, 2013 in co-pending U.S. Appl. No. 13/185,066.

Office Action mailed Aug. 26, 2014 in co-pending U.S. Appl. No. 14/071,009.

Office Action mailed May 23, 2014 in co-pending U.S. Appl. No. 13/183,777.

Notice of Allowance mailed Mar. 27, 2014 in U.S. Appl. No. 13/185,066 (now US Patent No. 8,799,480).

\* cited by examiner

```
#This file contains period in seconds and cumulative
bytes required per second for #http://www.youtube.com/
watch?v=7pA5UhNaYw0. This video's actual duration is 289
seconds 0 34657
1 62149
2 98611
3 150356
4 195610
5 246688
.
.
288 9826586
289 9833517
```

FIG. 5A

```
#This file contains period in seconds and cumulative
bytes required per second for #http://www.youtube.com/
watch?v=7pA5UhNaYw0. This video's actual duration is 289
seconds 0 34657
1 27492
2 36462
3 51745
4 45254
5 51078
.
.
288 48369
289 6931
```

FIG. 5B

ADAPTIVE CHUNKED AND CONTENT-AWARE PACING OF MULTI-MEDIA DELIVERY OVER HTTP TRANSPORT AND NETWORK CONTROLLED BIT RATE SELECTION

This application claims priority of U.S. Provisional Patent Application Ser. No. 61/313,872, filed Mar. 15, 2010, the disclosure of which is incorporated herein by reference in its entirety. This application is a continuation-in-part of U.S. patent application Ser. No. 12/696,378, filed Jan. 29, 2010, which claims priority of U.S. Provisional Patent Application Ser. No. 61/148,454, filed Jan. 30, 2009, the disclosures of which are incorporated herein by reference in their entireties.

BACKGROUND

One of the most popular, and network intensive, computer applications is video or multimedia playback over the internet. Several years ago, it was believed that the internet, with its aging protocols and lack of guaranteed delivery, would be unable to support video playback at a quality satisfactory to users. However, applications such as YouTube and Netflix have shown that quality video playback is possible.

There were various mechanisms that were created to improve the user experience. For example, in some embodiments, the client, which has a media player, requests and receives, the entire multimedia file before beginning playback of the file. This insures that, once the file begins playing, it will be able to continue uninterrupted. While this may be acceptable for shorter clips, such a scheme is unacceptable for longer files for several reasons. First, the user is forced to wait until the entire file is downloaded before seeing any portion of the clip. Such a wait may be unacceptable. Second, in an environment with limited network bandwidth, the entire file is transmitted, even if the user only watches the first few seconds of the video.

Another method is known as progressive download. In this embodiment, the client begins downloading the multimedia file from the server. When a certain threshold is reached, such as 3 seconds of the download has been completed, the media player on the client begins displaying the video. The threshold used may be fixed, or may be based on the resolution of the file, the average available network bandwidth or other parameters. This has several advantages over the previous method. First, the user does not need to wait until the entire file is downloaded before beginning to view the video. Secondly, bandwidth is potentially saved if the user chooses to navigate away from the video before it is completely downloaded. However, one shortcoming of this mechanism is that once the video has begun playing, the available bandwidth must remain above a minimum level to insure that the downloading of each subsequent portion of the video completes before that portion needs to be displayed. If the bandwidth decreases, the video may appear choppy, or may pause in order to allow the buffer to fill again.

Progressive download methods typically download the multimedia content at the maximum rate supported by the underlying transport within the limits of the player buffer (i.e. limiting the downloaded content not to overflow the player buffer by TCP acknowledgement mechanisms). These methods improve the quality of experience (QOE) by reducing stutters since the content is transferred to the client buffer, thus minimizing the possibility of player stopping during content presentation. However, one disadvantage is that when the transit network bandwidth is high compared to the media stream rate, significant content is downloaded to the player, and if the user cancels the current presentation, such as by moving on to a different media-clip, the network bandwidth used for the downloaded content that is not viewed is wasted.

Another mechanism used by Adobe Systems, Inc. is known as Real Time Messaging Protocol (RTMP). This mechanism controls content delivery using RTMP protocol over TCP, by controlled streaming of the content. Thus, the streaming mechanism maintains a window of what is delivered to the player relative to what is currently being played to the user. Thus bandwidth wasted due to user cancellations of active sessions is reduced, by limiting the content delivered to locations relatively close to the current display position. RTMP has also options to use HTTP or HTTPS as transport options.

Another mechanism is Real Time Streaming Protocol/Real-time Transport Protocol (RTSP/RTP). In this protocol, the server controls the rate of delivery of the content to the presentation rate, rather than delivering at the maximum rate of the underlying transport, such as TCP or UDP over IP.

In addition, several HTTP streaming protocols have been defined to deliver live or stored multimedia content at controlled rate (determined by the server or based on cooperation between the client and server) that matches the multimedia stream rate.

RTMP and HTTP streaming methods pace the content delivery, by limiting the rate at which content is delivered. RTMP uses protocol components in the client and the server, where as HTTP Streaming uses additional tags in the HTTP Requests and Responses.

In Adaptive Bit Rate Streaming (ABR Streaming), the client monitors the bandwidth to the server at the start up of multi-media session and at regular intervals during the multimedia play. Based on the monitored bandwidth, the client selects alternative encodings with different screen resolutions of the same content. The switching between alternative resolutions of the same media content is done explicitly by the client. Several applications, such as Ankeena TV, use ABR streaming over HTTP for live content delivery.

However, in this protocol, it is the client that determines the available bandwidth. Thus, in a radio access network, where devices are routinely added and removed from a particular cell, the client's limited knowledge of the overall network utilization may compromise its ability to accurately predict a suitable encoding and screen resolution in a timely manner.

Figure 1:
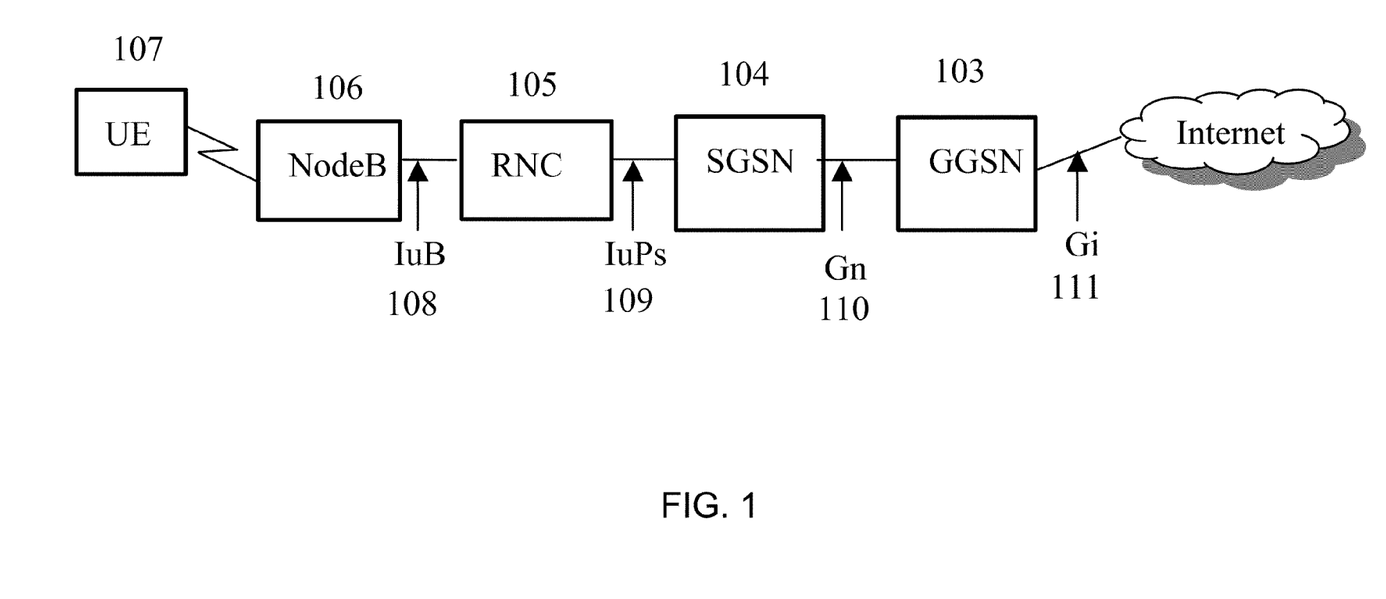
FIG. 1 shows an example Cellular Operator's 3G/UMTS network, showing the 3GPP Standards defined Network Elements and the corresponding interfaces between these Network Elements.

FIG. 1 shows a traditional 3G/UMTS network, including an UE (user equipment) 107, NodeB (or base transceiver station) 106, RNC (radio network controller or base station controller) 105, SGSN (Serving GPRS support node) 104, and a GGSN (gateway GPRS Support node) 103. Also shown in FIG. 1 is the protocol used to communicate between these various devices. For example, IuB 108 is the protocol used between Node B 106 and the RNC 105. Similarly, IuPS is the protocol used between the RNC 105 and the SGSN 104. Gn 110 is used between the SGSN 104 and the GGSN 103. Finally, Gi 111 is the IP based interface between the GGSN 103 and the internet.

It would be advantageous if a component in the radio access network, with visibility to total network traffic, were able to determine when a particular user was requesting multimedia content and based on that total network traffic, were able to configure the encoding and resolution of that multimedia content to maximize the user's quality of experience. In addition, it would be beneficial if that component could decouple wireless RAN traffic from core network traffic, by buffering multimedia content and delivering this content in a just-in-time manner to the end user device.

SUMMARY

A network device, capable of understanding communications between an end user and the core network on a RAN network is disclosed. In some embodiments, the device is able to decode the control plane and the user plane. As such, it is able to determine when the end user has requested multimedia content. Once this is known, the device can optimize the delivery of that content in several ways. In one embodiment, the device requests the content from the content server (located in the core network) and transmits this content in a just-in-time manner to the end user. In another embodiment, the device automatically changes/limits the options for encoding and resolution of the content available to the client, or pro-actively controls bandwidth for the specific flow so that the end user device initiates switching to a different encoding/resolution, based on overall monitored network traffic. In another embodiment, the device automatically selects the appropriate format and resolution based on overall bandwidth limitations, independent of the end user.

DETAILED DESCRIPTION OF THE INVENTION

Figure 2:
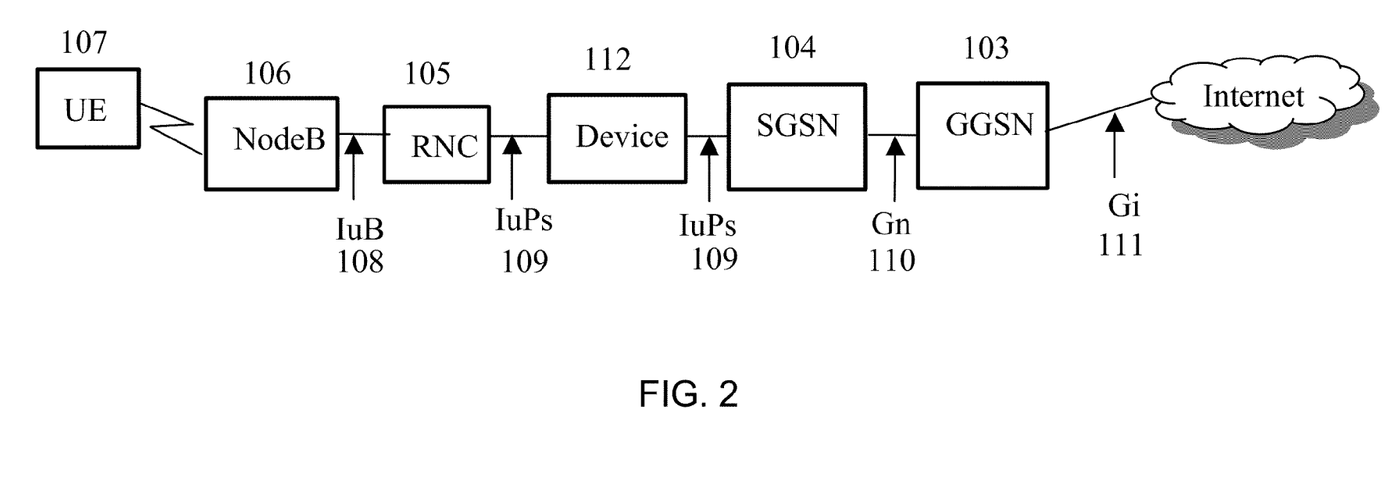
FIG. 2 is an example configuration showing the deployment of an embodiment of the invention on the IuPS interface between the RNC and SGSN in the 3GPP/UMTS Network.

FIG. 2 shows a device 112 capable of understanding communications on a RAN network and illustrates a possible interception point where that device may be inserted in a 3G/UMTS network. The device 112 is located between the RNC 105 and the SGSN 104. This figure is an example deployment scenario in a 3G/UMTS network; while example deployments in other RAN networks, such as in a CDMA network are not shown, the methods described here are equally applicable to such networks as well. In addition, the device 112 may be located between other components in a 3G/UMTS network, such as between the Node B 106 and the RNC 105, or between the SGSN 104 and the GGSN 103.

The device 112 is capable of understanding communications between UE 107 and the core network. In some embodiments, the device 112 is able to decode the control plane and the user plane. Such a device is described in co-pending patent application Ser. No. 12/536,537, filed Aug. 6, 2009, the disclosure of which is incorporated herein by reference in its entirety. As such, it is able to determine when the UE 107 has requested multimedia content. Once this is known, the device 112 can optimize the delivery of that content in several ways. In one embodiment, the device 112 requests the content from the server (located on the internet) and transmits this content in a just-in-time manner to the UE 107. In another embodiment, the device 112 automatically changes or limits the options for encoding/resolution available to the client, and/or changes the delivery rate (bandwidth) for the specific multimedia flow, thereby causing the client device to initiate switching to a different resolution, based on overall monitored network and traffic to the client device. If the bandwidth available is insufficient to admit the newly requested video flow, the device 112 may block sending the video, or return error code indicating unavailability of resources, thus improving the fair allocation of network resources to other users, and not degrading the quality of experience to already started, multi-media flows. In another embodiment, the device 112 selects the appropriate format and resolution based on overall bandwidth limitations, independent of the UE 107.

Figure 3:
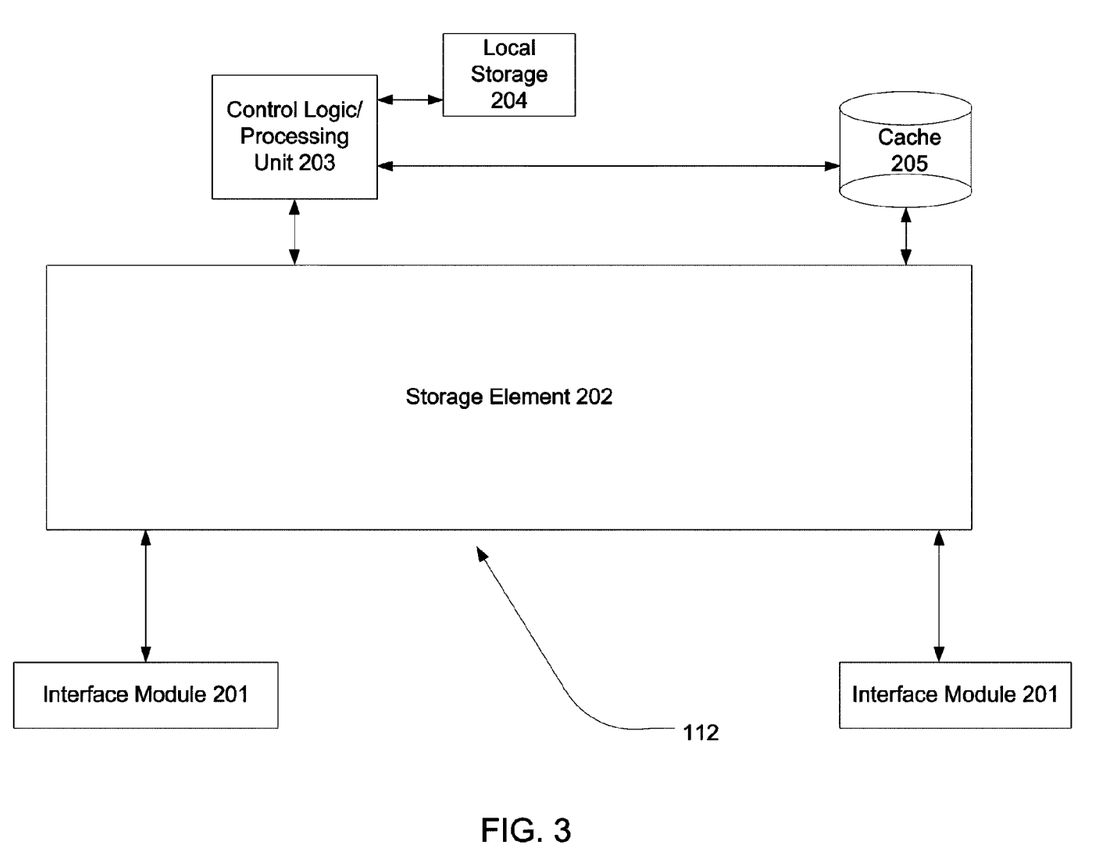
FIG. 3 shows a block diagram of the invention in accordance with one embodiment.

FIG. 3 shows a representative block diagram of the device 112. The device 112 has two interface modules 201, each of which is adapted to implement the hardware signaling required for the choice interface and the associated software protocol. This interface protocol may be IuB, IuPS or Gn, as shown in FIG. 2. Each interface module 201 is adapted to receive and transmit on the selected interface. Additionally, received data is placed into a storage element 202, typically a semiconductor storage element such as a RAM, DRAM or an equivalent technology. The movement of data from the interface module to the memory 202 and vice versa may be accomplished using dedicated hardware, such as a DMA controller. Alternatively, a dedicated data movement processor may be used to handle the actual movement of data through the device 112. Once stored within the device 112, the information is processed in accordance with the RAN specifications. This may be done using dedicated control logic or a processing unit 203. The control logic/processing unit 203 may have its own local storage element 204, which contains instructions to execute and local status. This storage element may be RAM or DRAM. In addition, at least a portion of this storage element 204 may be non-volatile, such as ROM, FLASH ROM, hard disk, Solid State Disk, or the like. Using known specifications and protocols, the control logic/processing unit 203 parses the received information to understand the packet at each protocol layer. Also included may be a large storage element 205, adapted to hold cached information. In some embodiments, this cache storage may be semiconductor memory, such as RAM or DRAM. In other embodiments, this cache storage may be a rotating media, such as a disk drive or other large storage device. The control logic/processing unit may be physically implemented in a variety of technologies. For example, it may be a general-purpose processor, executing a set of instructions from an internal or external storage device.

In another embodiment, a dedicated hardware device having embedded instructions or state machines may be used to perform the functions described. Throughout this disclosure, the terms "control logic" and "processing unit" are used interchangeably to designate an entity adapted to perform the set of functions described.

The device also contains software capable of performing the functions described herein. The software may be written in any suitable programming language and the choice is not limited by this disclosure. Additionally, all applications and software described herein are computer executable instructions that are contained on a computer-readable media. For example, the software and applications may be stored in a read only memory, a rewritable memory, or within an embedded processing unit. The particular computer on which this software executes is application dependent and not limited by the present invention.

Specifically, in one embodiment, the software includes a content aware pacing algorithm. This algorithm monitors the file parameters delivered in a container file. Based on these parameters and the available RAN bandwidth, the pacing algorithm delivers multimedia data to UE 107 in such a way so as to optimize playback quality and RAN network usage.

As described above, a client or UE 107 may have a media player, such as a Flash based video player. Media players typically buffer a predetermined amount of data before the video begins playing. However, once the media player begins displaying the content, the amount of content needed by the player must be delivered to the client before it is needed for display in order for the video to be stutter free. Hence, the device 112, and specifically the content aware pacing algorithm, uses a first configuration parameter referred to as keep_ahead, which is the amount of data, as measured in seconds, needed before starting to play the video. In other words, the video file is played in a media player, and as such, it takes a determinable time to display the content. Thus, when keep_ahead amount of data is provided, it is known that this amount of data will require keep_ahead second to display. Note that this amount of data is measured in terms of time. Therefore, depending on the video encoding and compression, two segments, each supplying keep_ahead worth of data, may comprise different numbers of bytes.

A second configuration parameter is referred to as latency_period, which is the Round Trip Time (RTT) from the UE 107 to the network device or server delivering the content. The round trip delay is estimated at different intervals during content delivery, or can be preconfigured. The parameter latency_period is meant to compensate for variation in network latencies to ensure stutter free delivery. Typically, the media player in the UE 107 needs keep_ahead seconds of data before starting the presentation, and needs to continue receiving that amount of data during play, so that the player does not run out of data during the play. If the network cannot keep up, i.e. cannot keep the buffer filled, the player is forced to pause and stutter during the playback of the content.

In other words, in a simple example, the device uses a keep_ahead parameter of 10 seconds and a latency_period of 2 seconds. In this scenario, the device 112 sends content to the UE 107 in 10 second chunks. Knowing that it may take up to 2 seconds (i.e. latency_period) to transfers the next chunk to the UE 107, the device 112 may start transmitting the next chunk 8 seconds later (i.e. keep_ahead—latency_period). In order to perform this scheme, the device 112 needs to know that the requested content is indeed multimedia, and also must know the amount of data that is required for each time period.

The device and method of the current invention use the metadata stored within the container file that describes the video object and uses this information along with a predetermined amount of read-ahead buffering to ensure that the Quality of Experience (QoE) of the video is retained. In some embodiments, the container file is referred to as an .flv file. The interested reader is referred to http://www.adobe.com/devnet/flv/ for a complete description of the FLV file format. Other container file formats also exist, and the present invention is not limited to this particular format. It is important to note that the device 112 constructs the delivery schedule based on the media container-type meta-data that it monitors and decodes from the incoming stream when the video is first accessed and not yet cached.

As described above and in co-pending patent application Ser. No. 12/536,537, the device 112 intercepts all communications between the UE 107 and the core network. It then decapsulates all traffic from the UE 107 to understand the communications that are occurring and re-encapsulates the traffic before transmitting it upstream to the core network. Similarly, the device 112 decapsulates traffic coming from the core network to understand communications back to the UE 107. As before, it re-encapsulates the data before transmitting it to the UE 107. In one embodiment, when a video download is requested by the UE 107, the device 112 may optionally parse the FLV file returned by the content server in the core network to determine the details of the video. The number of bytes to be downloaded per second is computed by the content-aware pacing algorithm located within the device 112. A brief description of the FLV file format is provided for completeness.

The FLV file contains a header and a body. The header contains information on whether there is video/audio content in the body of the file. The body of the file describes the stream and is composed of a set of tags. A tag contains the type of stream, length of data, and time of presentation of the data. For example, a tag might include that the stream is a video stream containing 99K bytes that should be presented 40 sec into the clip. Tags can be of three types: audio, video or script-data. A video tag describes a frame including the frame type, codec id, and the data. The frame type can be one of five options: Key frame, inter frame, disposable inter frame for H.263 only, a generated key frame or a command frame. Further the tag contains information about the type of codec used (JPEG, H.263, Screen video, AVC, etc.). The content-aware pacing algorithm utilizes timestamp and data size parameters in the FLV tag. However, it can use other information such as disposable inter-frame to drop frames in case of buffer under runs. While the operation is described here uses media-container of type FLV, the current methods are applicable to other container types as well (for example MP4, 3GP, 3G2) and are not limited by this disclosure.

The content-aware algorithm parses the FLV tags for timestamp and data size parameters. For VBR (Variable Bit Rate) video, the amount of data needed to play a second of video varies. The content-aware pacing algorithm creates a transmit schedule based on the information parsed from the FLV file. It computes the amount of data that needs to be delivered per second from the timestamps for frame (FLV tag) delivery and the associated data lengths. In some embodiments, this transmit schedule is generated as the file is received from the content server, and is kept only until the content has been transmitted to the UE 107. In other embodiments, the transmit schedule, in the form of per second information, is stored in a schedule file. This schedule file may be stored in the storage element 202 of the device 112. The schedule file contains entries for the amount of video content to be served per second. The content-aware pacing algorithm uses the schedule file along with the configured buffering parameters to implement a just-in-time video content delivery to the end user.

The adaptive chunked content-aware pacing algorithm of the current invention starts by scheduling download of content data-size to meet keep_ahead seconds of play-time. Since the underlying transport is TCP, the actual delivery time for sending the scheduled chunk depends on the link-bandwidth achieved to the client. The next data chunk delivery happens at (current_time+keep_ahead−latency_period). The amount of data is determined from the schedule file associated with the video object. Assuming a keep_ahead of 5 seconds, and a latency_period of 1 sec, the next chunk is scheduled at time=4 seconds. Subsequent chunks are scheduled 4 seconds after the transmission of the previous chunk. While the example shows burst scheduling at regular intervals, the scheduling intervals for chunks could vary depending on the current position in the media play, and relative variations of client link bandwidths when previous chunks or other multi-media, web pages, files etc. are transmitted to the same client device or other devices that share the same sector. At every burst, a minimum of keep_ahead worth of data would be sent. Each data chunk delivery happens at the maximum transfer rate that the underlying network layer supports.

Figure 5A:
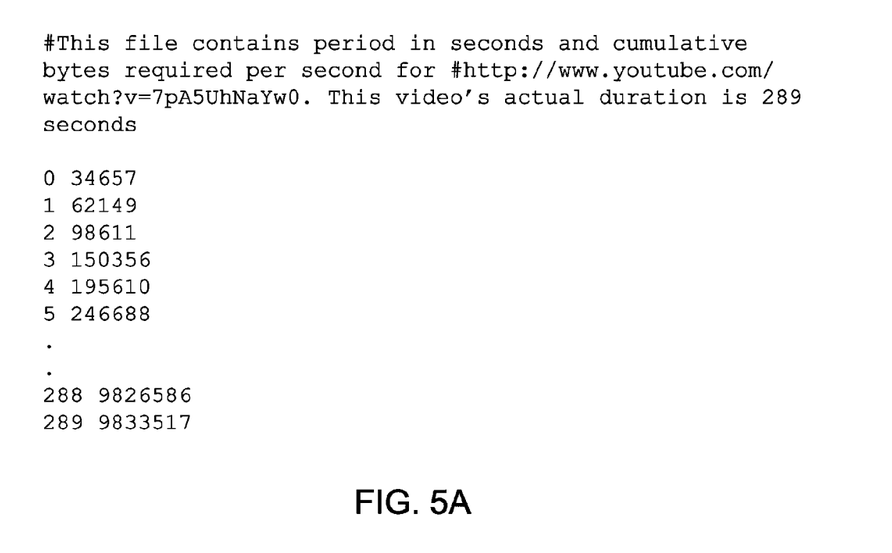
FIGS. 5A-B show two embodiments of a schedule file used according to the present invention.
Figure 5B:
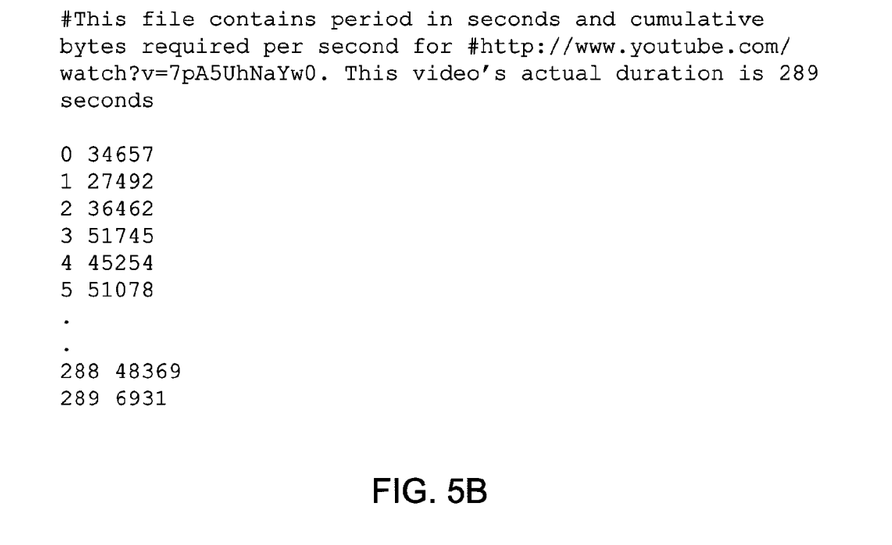

As and when video content is delivered to the device 112, the video delivery schedule is built incrementally and, optionally, is written to a schedule file, examples of which are shown in FIGS. 5A-B. As described above, in other embodiments, the video delivery schedule is generated and maintained only until the content is transmitted to the UE 107. The schedule file contains an entry per second. In FIG. 5A, each entry contains two fields: 1) play time in seconds and 2) the cumulative number of bytes of multi-media content that needs to be delivered to the end user ($data_n$). Thus, the data to be delivered in the '$n$'$^{th}$ second is ($data_n$-$data_{n-1}$). Once the schedule is built completely, parsing of the stream stops. This schedule can also be generated offline and kept as metadata information with the video-object or it can be built dynamically and incrementally as specified above.

Figure 4:
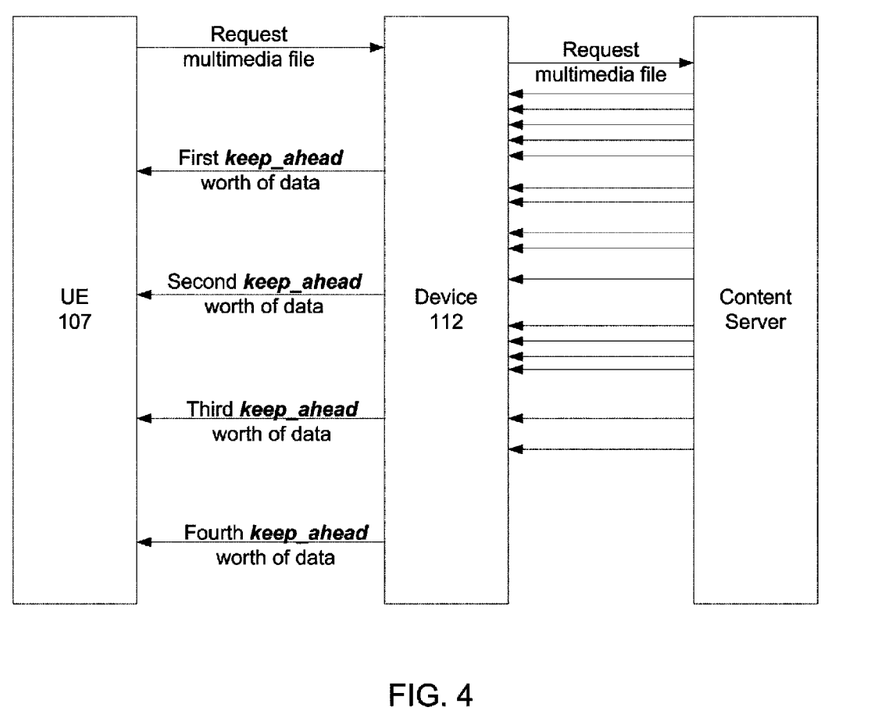
FIG. 4 is a diagram showing the transmission of multimedia files from a content server to user equipment according to one embodiment.

FIG. 4 shows a graph detailing communications between the device 112, the content server and the UE 107. As described above, the transaction begin when the UE 107 requests a multimedia file from a content server. The device 112 parses this information to understand that this is a transaction which can be paced using this content-aware pacing algorithm. The device 112 forwards the request to the content server. In response, the content server returns blocks of data, wherein each includes a header, such as a FLV format, which details specific information about the data, such as its length in bytes and its presentation time. The device 112 continues receiving this information from the content server and caches the multimedia file in its internal memory or storage element. At the same time, the device 112 is able to begin creating a schedule file, such as that shown in FIG. 5A, which shows the cumulative bytes required for each time period. In other embodiments, such as that of FIG. 5B, the schedule file stores the bytes required for each time interval, rather than the cumulative or running byte count.

As the device 112 receives data bytes from the multi-media content, it sends this data until keep_ahead bytes of data have been transmitted to the UE 107. Once this amount of data is transmitted to the UE 107, the device 112 pauses until the next configured chunk delivery time, as described above. The device 112 stores any bytes that it receives from the content server, such as in cache 205, for future transmissions to the UE 107. The device 112 continues to receive data from the content server and continues building the schedule file. At the specified time, such as keep_ahead-latency_period seconds after transmission of the previous transfer, the device 112 sends a second packet of keep_ahead bytes of data to the UE 107. This continues until either the file is completely transferred, or the user navigates away from the video. This latter action is detected by the device 112 typically by the termination of the TCP connection to the UE 107. Note that the device 112 interfaces on one side (i.e. to/from the content server) which is typically wireline and therefore has more predictable bandwidth and latency characteristics. The device 112 also interfaces to the UE 107, where wireless communication and varying numbers of devices and usage patterns impact latency. Thus, the device 112 serves to separate these two interfaces, allowing the content server to deliver data at one rate, and pacing the data to the UE 107 at a second rate.

While FIG. 4 shows that the device 112 receives content from the content server, it should be noted that the pacing algorithm can be used with previously cached content. In this embodiment, the device 112 has a copy of the desired content, and has a previously constructed schedule file. Using this information, the pacing algorithm is able to transmit the content to the UE 107 as described above.

The determination of the keep_ahead and latency_period parameters may be done in a variety of ways. In some embodiments, these values are fixed and remain constant for all UEs. In other embodiments, the parameters vary based on network conditions. For example, the latency_period is most obviously related to overall network bandwidth. The device 112 can monitor actual RAN bandwidth and adjust the latency_period parameter in real time. In other embodiments, this parameter may vary based on other characteristics, such as time of day. For example, the device 112 may decrease the latency_period during the late night hours, since the expected network traffic is lower. In other embodiments, the latency_period may be based on previously monitored bandwidth to this UE 107.

Similarly, the keep_ahead parameter can be modified in a number of ways. The choice of an optimal value for the keep_ahead parameter is based on balancing two competing goals. On one hand, smaller keep_ahead values allow the video to begin playing on the UE 107 sooner. These small values also minimize wasted bandwidth in the event that the user navigates away from the video. On the other hand, larger keep_ahead values are less susceptible to abrupt changes in network bandwidth, thereby minimizing the probability of pausing or stuttering. As suggested above, monitored network bandwidth, time of day, previously observed bandwidth or other characteristics can be used to set or modify the keep_ahead parameter.

There could be possibility of buffer under-run wherein server is not able to send out keep_ahead worth of data in specified time interval, in which case content-aware pacing algorithm sends out data at whatever rate that the underlying transport layer supports, and pacing benefits will not be seen here. However optionally information about disposable inter frame can be used here to drop inter-frames in case of under run.

In another embodiment, the device 112 is able to modify and select video formats and resolutions based on network activity. Again, since the device 112 is able to intercept and decapsulate user and control planes, it is able to determine the content of requests going from the UE 107 to a content server. Thus, the device 112 is able to modify these responses or the replies to these requests as appropriate. Using this technique, the device 112 is able to achieve network controlled bit rate selection. This allows the device 112 to set the initial resolution, which is referred to as Network Controlled Bit Rate selection.

In one embodiment, the UE 107 requests a video clip from a content server, such as YouTube. In response, the content server may provide a listing of the different resolutions in which that video is available. This list may be referred to as a format MAP. Typically, this list is supplied to the UE 107, which then selects a particular resolution. However, the device 112, having knowledge of this transaction may modify the format map returned to the US 107, based on observed network bandwidth. For example, the client may request a video which is available in a plurality of formats, from 240 to 720 p. In response to a request from the client, the content provider will supply this full list of formats. The device 112 may, based on observed bandwidth, determine that it is not possible to display the 720 p version of this video without pauses or stutters. Therefore, before sending this response back to the client, the device 112 modifies the response, and removes any formats which require bandwidth in excess of that which is currently available. Thus, the response received by the client contains only those formats which the device 112 believes can be displayed with an acceptable QoE.

In another embodiment, the request from the UE 107 may contain a flag, such as "&hd=1", indicating that the content server should include high definitions versions of the video in the format map. The device 112, determining that a high definition video cannot be properly displayed, may modify the request before transmitting it to the content server, such as by removing the flag "&hd=1". In this way, the content server will only return those formats which are not high definition.

Therefore, the device 112 is able to modify the format map received by the UE 107, either by modifying the request to the content server, or by modifying the response from the content server.

In another embodiment, the device 112 modifies the resolution of the video during transmission. For example, smooth streaming or adaptive streaming over HTTP is known. In this mechanism, the client continues to monitor its perceived network bandwidth, and adjusts the resolution or format of the video being played in real time. In other words, the client may be playing a 720 p version of a video and detect that the bandwidth of the network has dramatically dropped. In response, it may, without closing the media player, request a lower resolution version of the video, thereby changing resolution in mid-stream. Variations of this technique exist in Microsoft Silverlight, Netflix player and Adobe OSMF. However, in all of these embodiments, it is the client that determines the available bandwidth. Therefore, the client is typically reactive to changes (both positive and negative) in bandwidth.

RAN networks offer unique challenges in that the number of devices in the network and the amount of traffic each generates can change rapidly and unpredictably. Thus, it would be beneficial if a component, such as device 112, were able to monitor the network activity and make decisions about changing video resolutions. In one embodiment, the device 112 transmits video data to the UE 107. This can be done according to the technique described above, or using other traditional methods. While this transmission of the video is occurring, the device 112 continuously monitors network activity. If a change is noted in network bandwidth (either positive or negative), the device 112 can adapt.

In one embodiment, the device 112, upon determining a change in RAN bandwidth, begins requesting the alternative resolution from the content server (if it is not cached). Once the device 112 has received this video in the alternative resolution, it automatically begins transmitting it to the UE 107. The device 112 may recognize a convenient boundary point (for example, key frames or at the GOP Frame boundaries) for this transition. This embodiment assumes that the media player of the UE 107 is able to adapt to changes in resolution which are made unilaterally by the device 112.

In other embodiments, the media player of the UE 107 may only be able to adapt to changes in resolution if those changes were requested by the media player itself. In this embodiment, the device 112 may modify its behavior so as to encourage the media player to change resolutions. For example, assume that the RAN bandwidth greatly increased. In order to get the media player to request a higher resolution format of the video, the device 112 may accelerate its delivery of video data to the UE 107, so as to fill or overcome its buffer. This increased data rate to the UE 107 may cause the media player to request a higher resolution format. Conversely, the device 112 may slow its delivery of data to the UE 107 so that the media player's buffer empties or nearly empties, causing the media player to request a lower resolution version.

If these techniques are used in conjunction with the initial resolution selection, the network is able to determine and optimize video resolutions throughout the RAN, based on actual monitored traffic and congestion.

In another embodiment, the device 112 parses the communications between the UE 107 and the core network to determine that the UE 107 is requesting a multi-media file. The device 112, aware of the bandwidth required by such a multi-media file, first determines the available bandwidth of the RAN. For example, if there is little other traffic, the device 112 will honor the request. However, if the available bandwidth is low, due to a high number of devices, a large number of data-intensive transactions, or a combination of these factors, the device 112 may deny the request of the UE 107. In this case, the device 112 may return an error message or simply not deliver the file to the UE 107 if the available bandwidth is above a predetermined threshold. In some embodiments, the device 112 denies the request before the request for data is forwarded to the content server. In other embodiments, the device 112 makes the determination to deny the request after receiving at least part of the file from the content server, but prior to delivering the content to the UE 107.

The terms and expressions which have been employed herein are used as terms of description and not of limitation, and there is no intention in the use of such terms and expressions of excluding any equivalents of the features shown and described (or portions thereof). It is also recognized that various modifications are possible within the scope of the claims. Other modifications, variations, and alternatives are also possible. Accordingly, the foregoing description is by way of example only and is not intended as limiting.

What is claimed is:

1. A network device, adapted to operate on a cellular RAN network, wherein components in said RAN network communicate using a control plane, a user plane and a plurality of protocols, said device comprising:
   first and second interface modules, each adapted to communicate with a respective first and second component in said RAN network, such that one of said interface modules receives content from a content source and a second of said interface modules delivers content to a user device on said RAN network;
   a storage device; and
   control logic adapted to:
      decapsulate said control and user plane protocols in communications between said first and second component,
      based on said decapsulated control and user plane protocols, monitor traffic and available bandwidth of said RAN network,
      determine that one of said communications comprises content from said content source, wherein said content comprises a multimedia file and the byte count associated with each presentation time interval of said content, and
      based on said determined byte count, said monitored traffic and said available bandwidth, control the delivery of said content to said user device to optimize resources of said RAN network.

2. The network device of claim 1, wherein said content is delivered in packets to one of said interface modules from said content source; and where said packet comprises said content and a header comprising information about said content, said information comprising presentation time and byte count.

3. The network device of claim 2, wherein said control logic is adapted to create a transmit schedule comprising information about presentation time intervals and associated byte counts.

4. The network device of claim 2, wherein said packets comprise container files and said container files utilize FLV, MP4, 3GP, or 3G2 format.

5. The network device of claim 1, wherein said control logic determines a first parameter defining the amount of content to be sent to said user device at one time, said first parameter related to a time required to consume said content.

6. The network device of claim 5, wherein said control logic determines a second parameter defining a time needed to deliver said amount of said content to said user device.

7. The network device of claim 6, wherein said control logic monitors activity in said RAN network and modifies said second parameter according to said monitored activity.

8. A method of delivering content to a user device on a cellular RAN network, wherein components in said RAN network communicate using a control plane, a user plane and a plurality of protocols, said method comprising:
   using a network device located between said user device and a content server to monitor communication between said user device and other components in said RAN network to decapsulate said control and user plane protocols in order to determine the byte count associated with each presentation time interval of said content to be delivered;
   monitoring the activity in said RAN network;
   determining a presentation time interval, said presentation time interval used to define the quantity of content to be transmitted to said user device in a single chunk;
   transmitting said content destined for said user device from a content server to said network device;
   dividing said delivered content into a plurality of chunks, using said network device, each chunk comprising a number of bytes of data determined to provide content that will be consumed by said user device in said presentation time interval;
   estimating the time required to deliver said chunk from said network device to said user device based on said monitored activity;
   transmitting a first of said plurality of chunks from said network device to said user device;
   waiting a predetermined time before transmitting a second of said plurality of chunks from said network device to said user device, wherein said predetermined time is calculated based on said presentation time interval and said estimated time to deliver said chunk.

9. The method of claim 8, further comprising storing said content in a storage element in said network device prior to delivery to said user device.

10. The method of claim 8, wherein if, before expiration of said predetermined time, said user terminates use of said content, said second chunk is not delivered from said network device.

11. A method of controlling the content delivered to a user device on a cellular RAN network, wherein components in said RAN network communicate using a control plane, a user plane and a plurality of protocols, said method comprising:
   using a network device located in said RAN network and disposed between said user device and a content server to monitor communication between said user device and said content server in said RAN network to decapsulate said control and user plane protocols in order to determine the content of communications between said user device and said content server;
   receiving a communication and determining a request for content is being made by said user device to said content server;
   transmitting said request to said content server;
   receiving a response from said content server, said response including a list of available formats from said content server;
   monitoring the activity in said RAN network;
   modifying said list received from said content server based on said monitored activity; and
   transmitting said modified list to said user device.

12. The method of claim 11, wherein said list comprises at least two available formats, and said network device removes one of said formats from said list prior to said transmission to said user device.

13. A method of controlling the content delivered to a user device on a cellular RAN network, wherein components in said RAN network communicate using a control plane, a user plane and a plurality of protocols, said method comprising:
   using a network device located in said RAN network and disposed between said user device and a content server to monitor communication between said user device and a content server in said RAN network to decapsulate said control and user plane protocols in order to determine the content of communications between said user device and said content server;
   receiving a communication and determining a request for content at a specific format is being made by said user device to said content server;
   monitoring the activity in said RAN network;
   modifying said request based on said monitored activity before forwarding to said content server;
   transmitting said modified request to said content server; and
   transmitting a response from said content server to said user device.

14. The method of claim 13, wherein said request comprises a flag requesting high definition formats and said network device removes said flag from said request prior to said transmission to said content server, based on monitored network activity.

15. A method of delivering content to a user device on a cellular RAN network, wherein components in said RAN network communicate using a control plane, a user plane and a plurality of protocols, said method comprising:
   using a network device located in said RAN network and disposed between said user device and a content server to monitor communication between said user device and other components in said RAN network to decapsulate said control and user plane protocols in order to determine that a multimedia file having a first resolution is being delivered from a content server to said user device;
   monitoring the activity in said RAN network;
   receiving packets comprising said multimedia file having said first resolution from said content server and using said network device to transmit said packets to said user device;
   determining that, based on said monitored activity, said resolution should be modified to a second resolution;
   requesting said multimedia file having said second resolution to be delivered to said network device from said content server; and
   delivering said multimedia file having said second resolution to said user device from said network device.

16. The method of claim 15, wherein said network device delivers said multimedia file having said second resolution automatically.

17. The method of claim 15, wherein said network device modifies its delivery of said multimedia file to cause said user device to request said multimedia file having said second resolution.

18. The method of claim 17, wherein said network device decreases its rate of delivery of said multimedia file having said first resolution so as to cause said user device to request said multimedia having said second resolution, wherein said second resolution is less than said first resolution.

19. The method of claim 17, wherein said network device increases its rate of delivery of said multimedia file having said first resolution so as to cause said user device to request said multimedia having said second resolution, wherein said second resolution is greater than said first resolution.

20. A method of controlling the content delivered to a user device on a cellular RAN network, wherein components in said RAN network communicate using a control plane, a user plane and a plurality of protocols, said method comprising:
  using a network device located in said RAN network and disposed between said user device and a content server to monitor communication between said user device and a content server in said RAN network to decapsulate said control and user plane protocols in order to determine a request for content is being made by said user device to said content server;
  monitoring the activity in said RAN network;
  transmitting said requested content to said user device only if said monitored activity is below a predetermined threshold.

21. The method of claim 20, wherein said network device does not forward said request to said content server if said monitored activity is above said threshold.

22. The method of claim 20, wherein said network device forwards said request to said content server, and makes a determination to transmit said content to said user device after receiving at least a portion of said content from said content server.

23. The method of claim 20, wherein said network device transmits an error message to said user device if said activity is above said threshold.

* * * * *